June 15, 1965 H. F. WELSH 3,189,291

TAPE HANDLING MACHINE

Filed Nov. 14, 1955 3 Sheets-Sheet 1

INVENTOR.
H. FRAZER WELSH
BY
Charles E. England
AGENT

June 15, 1965 H. F. WELSH 3,189,291

TAPE HANDLING MACHINE

Filed Nov. 14, 1955 3 Sheets-Sheet 2

INVENTOR.
H. FRAZER WELSH
BY
Charles C. English
AGENT

June 15, 1965 H. F. WELSH 3,189,291
TAPE HANDLING MACHINE
Filed Nov. 14, 1955 3 Sheets-Sheet 3

INVENTOR.
H. FRAZER WELSH
BY
Charles E. English
AGENT

United States Patent Office 3,189,291
Patented June 15, 1965

3,189,291
TAPE HANDLING MACHINE

Herbert Frazer Welsh, Philadelphia, Pa., assignor to Sperry Rand Corporation, New York, N.Y., a corporation of Delaware Filed Nov. 14, 1955, Ser. No. 546,643
17 Claims. (Cl. 242—55.12)

The present invention relates to improved apparatuses for the handling of tapes or webs, such as may be employed in information recording and reproducing systems; and is more particularly concerned with improved structures of this type utilizing pneumatic techniques in the selective translation of a tape or web.

In various forms of information recording and reproduction techniques it is ordinarily required that a web or tape-like record-bearing material be selectively passed across a recording and playback station. It has been found that maximum efficiency is achieved when such a web or tape is moved in short bursts so that discrete quanta of information can be recorded on or extracted from the tape. These quanta of information may be of variable lengths, but more commonly take the form of a fixed conveniently or arbitrarily chosen amount of information which will be read into or from the recording material in a single operation. When such systems are employed, the operation thereof ordinarily necessitates accelerating a tape or web or recording material from rest to a full reading or recording speed, and this acceleration must be accomplished in as short a time, and in as short a length of tape or web, as possible. Actual recording or reproduction of information cannot in fact take place until the tape or web has reached full speed, for any information operation performed prior to this full speed translation of the tape will result in an inaccurate recording or reproduction of information on the record-bearing material.

In most practical applications of such recording or reproduction techniques, the tape or web of information-bearing material is stored on a supply reel and the tape, after passing through the recording or playback station, is received by a take-up reel. Because of the amount of tape ordinarily required in practical applications, the supply and take-up reels represent relatively massive components in the system, whereby a relatively long time is required to accelerate these reels to full speed. Because of this consideration, prior art information reading and reproduction systems are relatively inefficient in operation and appreciable lengths of tape are wasted during the time required for the reels and tapes to reach a desired operating speed.

The present invention serves to obviate this known difficulty of prior art systems; and in addition, provides a recording or playback structure capable of higher operating speeds and capable of embodiment in simpler and more compact equipment than has been the case heretofore. The invention accomplishes these advantages through the utilization of pneumatic techniques in web or tape handling structures; and in particular, employs pneumatic tape boxes interposed between supply and take-up reels and a playback or recording station whereby tape loops may be stored and accelerated rapidly to permit the actual recording or reproduction of information on a tape length moving at full speed at times when the supply and take-up reels are still accelerating toward a desired operating speed.

The present invention further accomplishes the advantages discussed above through the provision of an automatic tensioning system which is arranged to insure that a proper supply of tape is maintained in the aforementioned loop boxes at all times; and this supply of tape, in accordance with the present invention, is rapidly accelerated to an operating speed under the influence of pneumatically operated capstans, in combination with a recording or playback station which also includes pneumatic apparatus. These structures, when combined in the manner to be described, provide an over-all system which is capable of symmetrical operation, whereby information can be read from or written into a storage member in either of two opposed directions of travel; and in addition, results in a system eliminating components heretofore thought necessary, such as Selsyn controls and sensing arms with their accompanying circuits. Further, the structure, as mentioned previously, permits a tape to be accelerated to a desired operating speed with less tape waste than has been the case in the past; and further permits greater tape speeds to be utilized while at the same time effecting longer tape life.

It is accordingly an object of the present invention to provide an improved tape handling machine.

Another object of the present invention resides in the provision of an information recording or reproduction system capable of accelerating a recording medium to a desired operating speed in a shorter time and with less tape wastage than has been the case in the past.

A still further object of the present invention resides in the provision of an improved pneumatically controlled tape or web handling apparatus.

Still another object of the present invention resides in the provision of a tape or web handling apparatus employing vacuum boxes for the storage of tape loops.

A still further object of the present invention resides in the provision of improved vacuum boxes for the storage of tape at varying tensions dependent upon system conditions external of the boxes.

Still another object of the present invention resides in the provision of an improved information tape handling system capable of symmetrical operation whereby information may be written into or read from an information medium in either of two opposed directions.

Still another object of the present invention resides in the provision of a tape handling structure which is more simple and compact in construction than has been the case heretofore.

Another object of the present invention resides in the provision of an improved tensioning system for automatically insuring that a proper supply of tape or web is available for rapid acceleration and deceleration.

Still another object of the present invention resides in the provision of improved pneumatic capstan structures for the selective acceleration and translation of a tape or web.

Another object of the present invention resides in the provision of an improved reading or recording station, for instance a magnetic transducer, employing pneumatic techniques for selectively air-floating a tape during translation, and for rapidly decelerating a moving tape at desired times.

A still further object of the present invention resides in the provision of an improved information recording and reproduction apparatus capable of utilization in electronic digital computer systems.

The foregoing objects, advantages, construction and operation of the present invention will become more readily apparent from the following description and accompanying drawings, in which.

Figure 1:
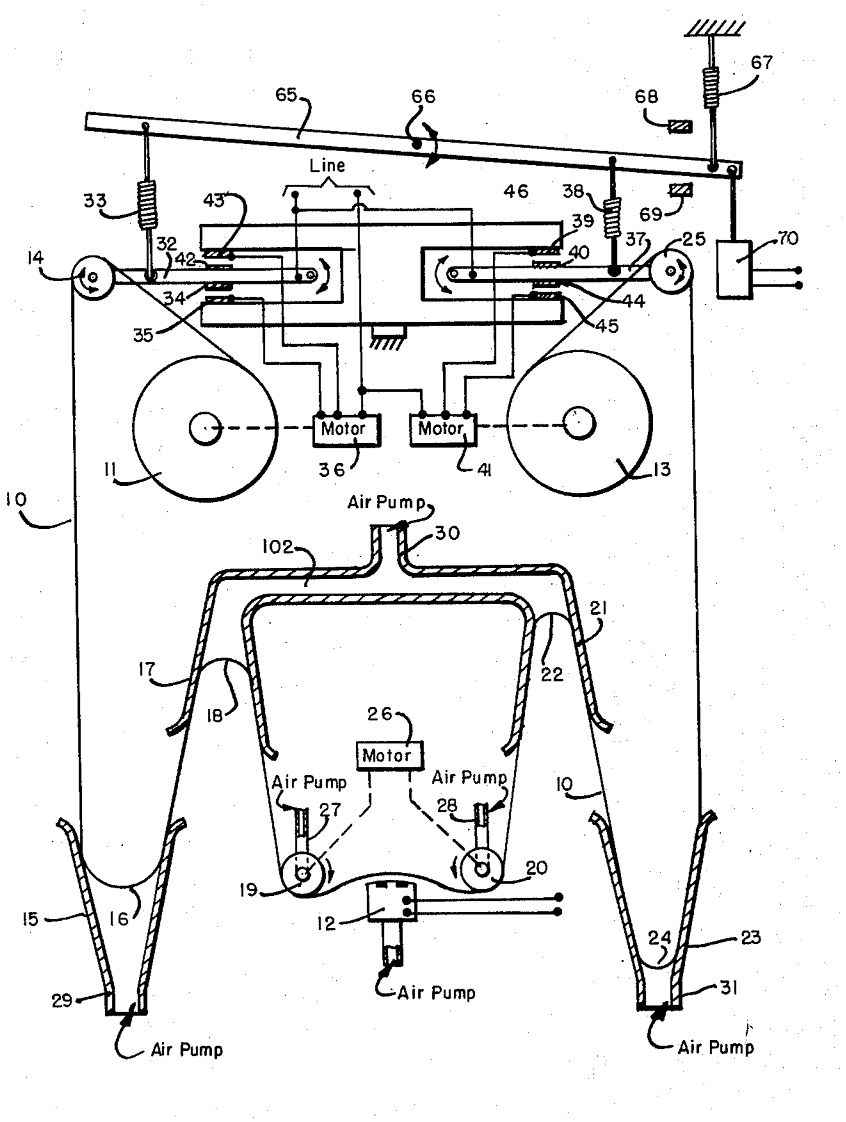
FIGURE 1 is a diagrammatic view which illustrates an improved tape or web handling machine constructed in accordance with the present invention.

Referring now to FIGURE 1, it will be seen that, in accordance with the present invention, an elongated tape or web 10 may be stored upon a storage reel 11 and selectively passed across a recording or reproduction station, comprising a transducer 12, to a pick-up reel 13. As will appear from the subsequent discussion, the system to be described is capable of symmetrical operation and therefore the nomenclature "supply reel" and "pick-up reel" has been arbitrarily applied to reels 11 and 13 respectively. Tape 10 may comprise an elongated information surface wherein information is stored by magnetic, mechanical, or photoelectric techniques, and the particular form of the pick-up station 12 will vary according to the nature of the tape 10 and the information to be recorded thereon. In the subsequent description, it is assumed that tape 10 is of a magnetic nature, and transducer 12 is therefore described, for instance in reference to FIGURE 5, as a magnetic transducer. The alternative forms of construction mentioned are also contemplated by the present invention, however.

Tape 10 is caused to pass from supply reel 11 over a rotatable pulley 14 into a first pneumatic loop box 15 whereby the tape is retained in the said box 15 as a loop 16, and the tape then passes from loop 16 into a further pneumatic loop box 17, thereby to define another loop 18. From loop box 17 the tape 10 passes under a rotating capstan 19 across the recording or playback station 12, and thence under a further rotating capstan 20 into still another pneumatic loop box 21 wherein the tape 10 is retained as a still further loop 22. From loop box 21, tape 10 passes to still a further pneumatic loop box 23, wherein the tape is retained as a loop 24; and the tape then passes across a still further rotatable pulley 25 to the take-up reel 13. The several loop boxes 15, 17, 21, and 23 act to accumulate sufficient lengths of tape between the supply reel 11 and take-up reel 13 to permit the tape 10 to be rapidly accelerated under the control of one of capstans 19 or 20, past work station 12, at times when the reels 11 and 13 are moving more slowly than the desired speed of tape translation past station 12. In this respect it should be noted that capstans 19 and 20 are caused to constantly rotate in opposing directions by a motor 26, and a gearing system (not shown), and one or the other of capstans 19 and 20 is caused to be selectively operative in effecting tape translation, under the control of air pumps supplied to the capstans 19 and 20, at inlets 27 and 28 respectively. This operation will become more readily apparent from the subsequent description of FIGURE 4.

Tape boxes 15, 17, 21 and 23 are, as mentioned, pneumatic in form, and take a tapered configuration. The tape loops enter and leave at the mouths of the loop boxes, and the said loop boxes are in turn partially evacuated by air pumps supplied to the necks of the boxes, indicated at 29, 30 and 31. Because of the tapered construction employed in the loop boxes 15, 17, 21 and 23, it will be appreciated that when a tape loop, such as 16, is at the outer edge or mouth of the loop box, the force developed on this loop, due to atmospheric pressure, will be quite large so long as the tape loop remains adjacent the mouth of the box. On the other hand, when the loop, such as 16, is caused to move toward the lower end of the loop box, whereby the tape is stretched across a rather narrow opening, a considerably lower force will be developed upon the tape due to atmospheric pressure. Intermediate positions between the relatively wide mouth and the relatively narrow neck of the boxes will effect intermediate pressures upon the tape loop retained in the box so that the tension developed on the tape itself will be progressively smaller as the tape is drawn farther and farther into the loop box.

It should further be noted that inasmuch as a common length of tape passes through the several boxes 15, 17, 21 and 23, the amount of tension imposed on the tape 10 will be the same throughout the length of tape; and the several loops 16, 18, 22 and 24 will therefore assume appropriate positions within the several loop boxes to provide this equalized tension condition. Thus, at rest, the over-all system is characterized by a condition wherein the tape 10 is retained in several loop boxes interposed respectively between the recording station and a supply reel and between the recording station and a pick-up reel; and this condition will be one of stable equilibrium.

If, on the other hand, a length of tape should be caused to move from left to right across the recording station 12, under the control of counter-clockwise rotating capstan 20, the loops 16 and 18 will be drawn out of their respective boxes 15 and 17, and this drawing out of the loops will effect an increased tension upon the tape between loop box 15 and pulley 14 for instance, whereby an arm 32 will be drawn downward against the restraint of a spring 33 to effect contact between points 34 and 35 thereby energizing motor 36 in a proper direction of rotation to supply additional tape from supply reel 11 to the boxes 15 and 17. Similarly, this assumed translation of tape 10 from left to right will cause the loops 22 and 24 to feed inward with respect to vacuum boxes 21 and 23 thereby reducing the tension on the tape portion between vacuum box 23 and rotatable pulley 25 whereby a further pivotal arm 37 will be caused to move upward under the influence of a spring 38 thereby to establish contact between contacts 39 and 40 for energizing a motor 41. This energization of motor 41 causes rotation of pick-up reel 13 in proper direction to draw the tape loops 22 and 24 out of their boxes 21 and 23.

Symmetrical operation is possible, in accordance with the foregoing discussion and the arm 32 is also associated with further contacts 42 and 43, while arm 37 is also associated with a set of further contacts 44 and 45, whereby a decreased tension on the tape between box 15 and pulley 14 causes arm 32 to move upwardly, thereby energizing motor 36 to cause reel 11 to draw additional tape out of the boxes 15 and 17. Increased tape tension between loop box 23 and rotatable pulley 25 will cause arm 37 to move downward against the spring 38 whereby contacts 44 and 45 will close to energize motor 41 thereby causing reel 13 to feed tape into boxes 23 and 21. Thus, the foregoing equalization in tape tension is automatically achieved; and when tape is caused to be drawn out of a set of vacuum boxes under the control of an appropriate capstan, such as 19 or 20, the tape loops being drawn out of the boxes move toward the mouths of the boxes increasing the tension on the tape and automatically energizing a reel driving motor to feed additional tape into the boxes.

To summarize the foregoing operation and construction, it will be seen that the present invention provides a supply of tape capable of rapid acceleration in pluralities of vacuum boxes interposed between a work station and a tape supporting reel. When the tape is accelerated out of these boxes past the work station, an increased tension is imposed upon the tape due to the action of atmospheric pressure, and this increased tension in turn effects an automatic energization of a reel driving motor to supply additional tape to the boxes. On the other hand, when tape is being fed into vacuum boxes interposed between a work station and a supply reel, a decreased tension is effected upon the tape whereby a motor is once more automatically energized again to drive the reel in proper direction to draw tape out of the boxes.

In practice, the tape boxes are of such size that they will not be completely exhausted or filled with tape during the time required for the supply and take-up reels 11 and 13 to come up to full speed. Due to the loops of tape stored in such boxes, therefore, relatively light lengths of tape can be rapidly accelerated to a desired operating speed under the influence of pneumatically operated capstans, and these tape lengths, once accelerated, can be immediately employed for the recording or reproduction of information at times when the supply and takeup reels are still building up to speed.

Figure 2A:
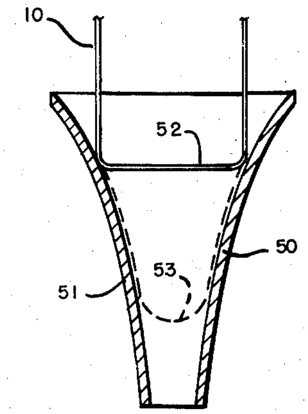
FIGURES 2A and 2B are sectional views which show modified tapered loop boxes such as may be employed in the present invention.
Figure 2B:
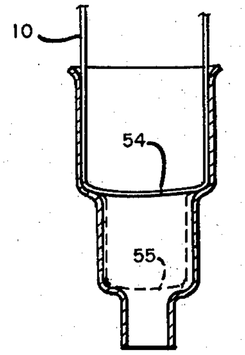

The particular tape boxes 15, 17, 21 and 23, illustrated in FIGURE 1, take the form of a straight-sided box in the nature of a funnel. Alternative constructions are illustrated in FIGURES 2A and 2B, however, and it will be seen that, as shown in FIGURE 2A, the tapered tape box may define curved surfaces 50 and 51 generated by some exponential function. When such a tape box is employed, the tape 10 will once more be subjected to a relatively large pressure force when it is disposed adjacent the mouth of the box, as at 52; while the said tape 10 will be subjected to a decreased pressure force when it is drawn into the box toward the neck thereof, as at 53. The tape boxes may also take the form of a box wherein the sides are progressively narrowed in a series of one or more steps, as illustrated in FIGURE 2B, so that the tape 10 is subjected to a first relatively large force when it assumes the position identified as 54, and the said tape 10 is subjected to a lesser force when it assumes the position identified at 55.

These various forms of boxes, and combinations thereof, are contemplated by the term "tapered loop box" discussed in the present specification and included in the appended claims; and it will be appreciated that modifications in these structures may be effected without departing from the present invention. For purposes of definition, a tapered tape box is merely meant to denote a structure having a neck which is narrower than the mouth thereof whereby differing atmospheric forces will be applied to the tape as the tape changes in location between the mouth and neck of the box.

As has already been discussed in reference to FIGURE 1, the automatic tensioning system of the present invention employs an arm 32 in conjunction with a spring 33 tending to draw the arm clockwise; and this rotational force is opposed by the tension on tape 10 applied to the arm 32 via the rotatable pulley 14. Any inequality in these forces effects a closure of either contacts 34 and 35, or 42 and 43, depending upon which of the two opposing forces predominates; and the closure of one or the other sets of contacts causes motor 36 to rotate reel 11 in one or the other of its possible directions of rotation, thereby to supply or withdraw tape from the boxes 15 and 17 in proper direction to restore the equality of tension. An analogous operation occurs with respect to reel 13 under the influence of arm 37 in association with spring 38 and contacts 39–40 and 44–45; and the several contacts 34–35, 39–40 and 42 through 45 inclusive, are supported as shown by an H-shaped structure 46, preferably of a non-conductive material.

Figure 3:
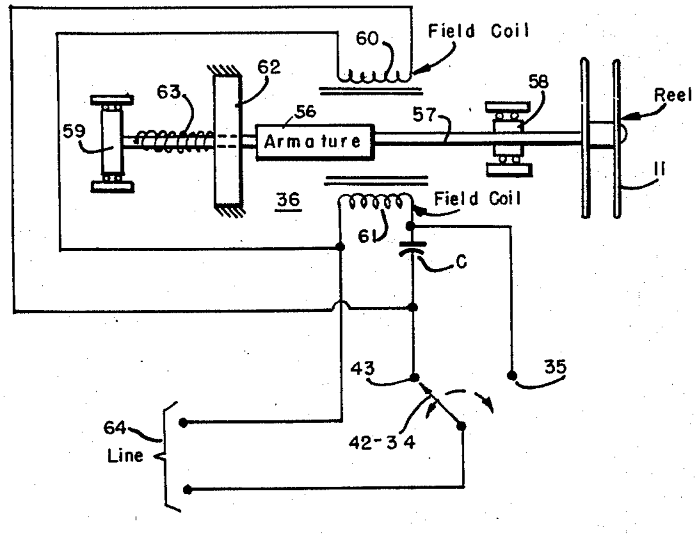
FIGURE 3 is a schematic view which illustrates a motor control system such as may be employed in the automatic rotation of the supply or take-up reels shown in FIGURE 1.

The actual operation of the tensioning system illustrated in FIGURE 1 will become more readily apparent from a consideration of the circuit shown in FIGURE 3; and it will be understood that this particular circuit relates to the automatic tensioning control of motor 36. An analogous arrangement may be employed in respect to the control of motor 41. Referring now to FIGURE 3, it will be seen that the motor 36 comprises a rotatable armature 56 coupled to a shaft 57 supported at its opposed ends by bearings 58 and 59. Shaft 57 in turn supports reel 11. The motor 36 is of the capacitor motor type, and includes a pair of field coil windings 60 and 61 in association with a capacitor C, whereby the armature 56 may be caused to rotate in either of two opposing directions depending upon whether the capacitor C is placed in series with winding 60 or in series with winding 61. Armature 56 is caused to normally impinge upon a fixed member 62 by a spring 63, whereby, in the absence of energization to the motor, the armature 56 is frictionally restrained against rotation. When the motor is energized, however, the field coils 60 and 61 tend to exhibit a solenoid action displacing armature 56 slightly away from the fixed member 62 whereby the said armature 56 may rotate in one or the other of its directions dependent upon the circuit connection of capacitor C.

In the particular example illustrated in FIGURE 3, energization to the motor 36 is provided from line 64, and one side of the said line 64 is coupled to the terminals 42–43 carried by pivotal arm 32 (FIGURE 1); while the other side of line 64 is connected to each of field coils 60 and 61. Contacts 42–34 cooperate with further contacts 35 and 43, in the manner already described; and these further contacts are coupled to opposing sides of the capacitor C, as illustrated in FIGURE 3. When central contacts 42–34 are positioned intermediate terminals 35 and 43, no energization is supplied to motor 36, and the system is at rest. If, however, due to increased tension upon the tape 10, the arm 32 is caused to move downwardly, thereby establishing contact between points 34 and 35, energization is supplied to the motor 36. The closure of contacts 34 and 35 supplies line voltage directly to field coil 61 and supplies further line voltage to a series connection of field coil 60 and capacitor C whereby the capacitor motor 36 is caused to rotate in a proper direction for the reduction of tension on tape 10.

If, on the other hand, the tension on tape 10 should be less than that imposed by spring 33 (FIGURE 1), arm 32 moves upward, closing contacts 42 and 43. Once more, energization is supplied to the motor 36 but this time the capacitor C is in series with field coil 61 rather than with field coil 60, whereby motor 36 rotates in a direction opposite to that effected by the closure of contacts 34 and 35. Thus, rotation in two possible directions may be effected under the control of an unbalance in tension in the system, and the rotation is such in each case that the aforementioned tension equalization is accomplished.

Before proceeding with a description of the other components preferably comprising the system shown in FIGURE 1, one further feature of the tape handling system should be noted. It will be appreciated from the foregoing discussion that during the time period in which the reel motors 36 and 41 are approaching the tape speed of the center drive effected by capstans 19 and 20 past work station 12, the supply loops, such as 16 and 18, shrink; while the take-up loops such as 22 and 24, expand in size. If the shrinking loop is initially positioned to its maximum size while the expanding loop is initially positioned to its minimum size, the size of the tape panel disposed between the supply reel and the pick-up reel will be kept at a minimum. Conversely, a small supply loop and a large take-up loop are desired before stopping the center drive, to provide for a time period in which the reel motors 36 and 41 decelerate to a stop. These further considerations in loop balance are effected by the structure shown in FIGURE 1 comprising elongated arm 65 pivoted at point 66 and associated with spring 67, stop members 68 and 69, and solenoid 70. As the arm 65 is drawn in a clockwise direction by retraction of solenoid 70, the tension in spring 38 is decreased; while the tension in spring 33 is increased. Arm 32 therefore moves upward, decreasing the amount of tape in loops 16 and 18; while arm 37 moves downward to increase the amounts of tape in loops 22 and 24. Conversely, deenergization of the solenoid 70 causes spring 67 to pivot arm 65 in a counter-clockwise direction until it is restrained by stop 68; in which event the tension in spring 38 increases as tension in spring 33 decreases, thereby to increase the amount of tape in loops 16 and 18 and to decrease the amount of tape in the loops 22 and 24.

Thus, prior to acceleration of the tape 10 past the work station 12, the solenoid 70 may be de-energized thereby assuring a maximum supply of tape in the loop boxes 15 and 17; while immediately prior to or substantially simultaneous with cessation of the center drive, the solenoid 70 may be energized thereby to assure that the amount of tape in loops 16 and 18 is relatively small while the amount of tape in loops 22 and 24 is relatively large during the deceleration process. It will be appreciated that by suitable adjustment of the springs 33, 38 and 67, the desired tape tension control may be properly effected to anticipate an impending acceleration or deceleration of the center drive.

Figure 6:
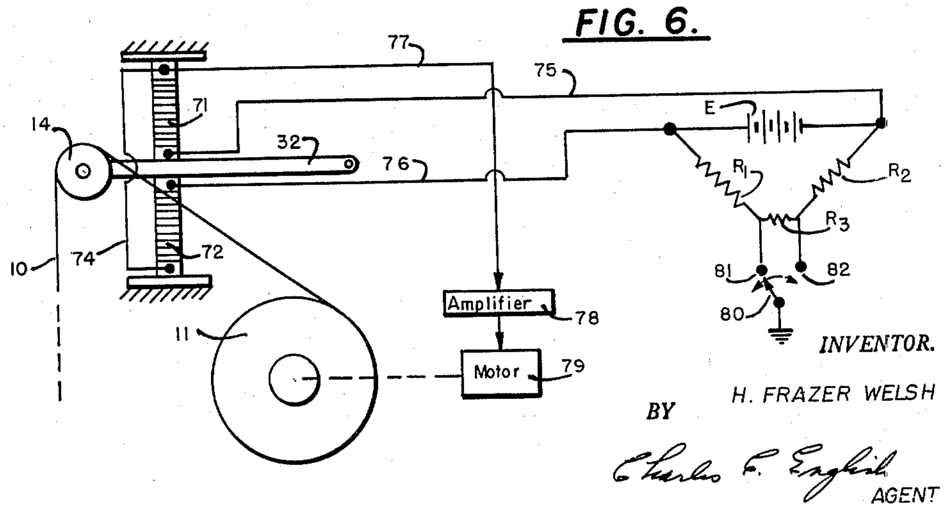
FIGURE 6 is a diagrammatic view which illustrates an alternative form of automatic tensioning system such as may be employed in the apparatus of FIGURE 1.

An alternative form of tape loop control is shown in FIGURE 6, and this particular portion of the circuit again will be described with reference to reel 11, arm 32 and rotatable pulley 14. The desired automatic tensioning control and automatic tape loop control may be effected in accordance with this particular embodiment by substituting a carbon pile resistor and bridge structure in association with a variable speed motor, for the spring 33, contacts 34, 35, 42 and 43, and motor 36; and the automatic tape loop control afforded by rotatable arm 65 may be accomplished by a variable bias control such as will be described.

Thus, referring to FIGURE 6, it will be seen that the arm 32 may be suspended between the pair of carbon pile resistors 71 and 72 and these carbon pile resistors are coupled together at one of their ends as at 74, and are connected at their other ends by lines 75 and 76 to a structure comprising resistors R1, R2, R3 and voltage supply E. Resistors 71, 72, and R1, R2 and R3 in combination with voltage supply E, take the form of a bridge circuit in which the said resistors 71 and 72 are variable in magnitude depending upon the pressure exerted upon them by arm 32. Any unbalance in the bridge takes the form of an error voltage appearing on line 77, and this error voltage may be coupled via amplifier 78 to a D.C. motor 79 whose speed varies continuously with the input voltage supplied thereto.

In practice, therefore, if the tension on tape 10 should increase thereby drawing pulley 14 and arm 32 downward, the pressure on resistor 72 will be increased while that on resistor 71 will be decreased. The error voltage thus effected will drive motor 79 in a proper direction, and at a proper speed, to reduce the tension on tape 10 until rebalance is established. Similarly, if the tension on tape 10 should decrease below a desired level, the arm 32 will be caused to move upwardly under the control of a spring (not shown) but similar to spring 33 of FIGURE 1, thereby increasing the pressure on carbon pile resistor 71 and decreasing the pressure on resistor 72, whereby once more an error voltage, this time of the opposite sense, is applied to motor 79 thereby to effect an increase in tension on the tape 10.

The tape loop control previously described in reference to rotatable bar 65 and its associated components, is accomplished in this particular form of the invention by a pivotal contact 80 associated with a pair of terminals 81 and 82 coupled to opposite ends of resistor R3. Arm 80 is grounded, as shown in FIGURE 6, and when connected to one or the other of terminals 82 or 83, places resistor R3 in series with one or the other side of the bridge. This variable placement of resistor R3 provides a bias error voltage in the system thereby causing the tape loops to assume a maximum or minimum size in their associated loop boxes in a manner analogous to that effected by energization of the solenoid 70 in FIGURE 1. As before, the pivotal arm 80 may be electrically controlled by an appropriate actuator, such as the solenoid 70 of FIGURE 1 or the switch contacts may comprise part of a relay whose actuating coil receives loop balance point shifting signals.

Returning now to the arrangement of FIGURE 1, it will be seen that the center tape drive past work station 12 is accomplished by counter rotating capstans 19 and 20. In a practical device, it is ordinarily desirable to accelerate the tape from a stationary position to full operating speed of a hundred or more inches per second, in a time of approximately $\frac{1}{1,000}$ of a second; and this acceleration is effected by the constantly rotating capstans 19 and 20 under the influence of pneumatic pressures applied via inlets 27 or 28.

Before proceeding with a detailed description of preferred capstan structures, however, it should be noted in passing that capstan 19 rotates in a clockwise direction, while capstan 20 rotates in a counter-clockwise direction; and this particular choice of rotation is utilized so that tape lengths are drawn across rather than being pushed across the work station. By providing a balanced capstan system having the directions of rotation described, it will be found that smaller tensions and smaller forces are imposed on the loop system than has been the case heretofore.

Figure 4:
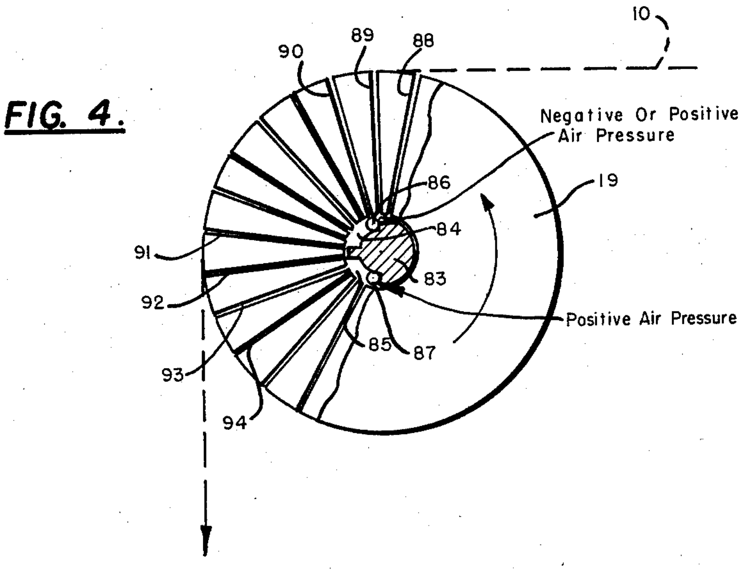
FIGURE 4 is a view, in partial section, which shows a preferred form of pneumatic capstan structure such as may be employed in the system of FIGURE 1.

The particular capstans, such as 19 and 20, may take the form illustrated in FIGURE 4, and such capstans ordinarily comprise a central, non-rotating shaft 83 having cutaway portions 84 and 85 supplied with air inlets or outlets 86 and 87 respectively. The rotating capstan such as 19, defines a plurality of radial passages, such as those identified as 88 through 94 inclusive. In practice, air inlet 87 may be supplied constantly with a source of positive air pressure, while inlet 86 may be selectively supplied with either positive or negative air pressure. When both of air inlets 86 and 87 are supplied with positive air pressure, an air film is created external and adjacent to the rotating capstan, such as 19. This state of control corresponds to one in which it is not desired that the capstan drive the tape; and it will be appreciated that when both of capstans 19 and 20 are at their positive pressure states the tape 10 will float free from the surfaces of the rotating capstans. No drive is therefore effected to the tape and the tape is not subjected to frictional forces of the rotating capstans. If it should now be desired to translate the tape 10 in a leftward direction (see FIGURE 1), negative pressure may be supplied to inlet 86 whereby the tape 10 is drawn against the rotating surface of capstan 19 and is driven by the clockwise rotation of the said capstan 19 in the proper direction. Positive air pressure is still supplied to inlet 87 so that the tape is prevented from binding upon the capstan 19 in the region of radial apertures 93 and 94, for instance.

Thus, by the system described, the application of negative air pressure to inlet 86 causes tape 10 to be drawn to and driven by the capstan 19 over an area corresponding to portion 84, and the tape will be positively prevented from binding upon the capstan by the action of air pressure supplied to the portion 85 via air inlet 87. In practice, it will be appreciated that inlet 87 may in fact merely comprise a port for the relieving of negative pressure previously induced in radial apertures such as 89 and 90. The system thus operates under the control of pneumatic pressure to drive the tape in either of two opposed directions; and this drive may be effected by the application of reduced air pressure to a desired driving capstan.

Figure 5:
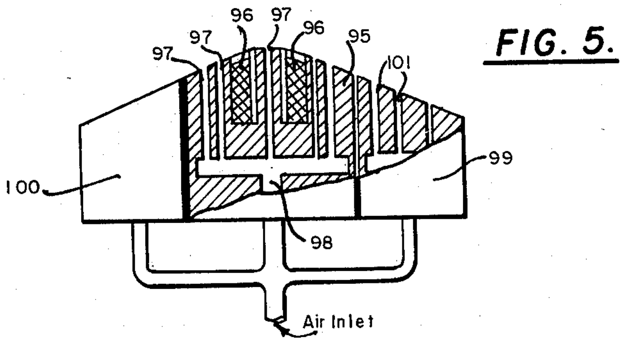
FIGURE 5 is a view, in partial section, which shows an improved transducer employing pneumatic techniques for selectively floating or binding a tape being processed.

The system also contemplates the provision of an improved transducer at the work station 12, once more employing pneumatic techniques for selectively air-floating the tape adjacent the work station or for binding the tape upon the work station, thereby to impose frictional forces upon the tape leading to a more rapid deceleration thereof. One form of transducer, acting in this manner, is illustrated in FIGURE 5.

Thus, the transducer may comprise a body 95 having a transducer control element 96 therein, which control element may take known forms of coils and pole pieces. A plurality of elongated apertures 97 are provided, as shown, and these apertures communicate with a port 98 to which positive or negative air pressure may be supplied. When the tape is passing across the head, positive air pressure may be supplied to the port 98 whereby an air film is created between the transducer and the moving tape. The tape therefore floats adjacent the head and is subjected to a minimum of frictional forces. In the alternative, when it is desired to decelerate the tape, negative pressure may be supplied to the port 98 whereby the tape is drawn into frictional contact with the transducer, aiding in the tape deceleration. To enhance this floating and binding action, a pair of further members 99 and 100 may be affixed to the transducer structure and these members may contain further apertures such as 101, when it is desired to increase the area of the floating surface or frictional binding surface.

By the foregoing system, therefore, extremely rapid tape accelerations are possible; and due to the floating action provided at the capstans 19 and 20, and at the work station 12, and due in addition to the minimum frictional forces imposed by the vacuum boxes 15, 17, 21 and 23, a minimum of wear is imposed upon the tape or web thereby substantially increasing tape life.

In addition to the automatic balancing actions already described in reference to the tapered tape boxes, an additional balancing action is achieved in the system shown in FIGURE 1 by the interconnection of vacuum boxes. Thus, referring to FIGURE 1 once more, it will be noted that vacuum boxes 17 and 21 are interconnected to a common air inlet by means of a relatively large common chamber 102. It will be appreciated from the foregoing discussion that at the beginning of tape acceleration from left to right, tape loop 18 will be at its maximum depth in box 17; while tape loop 22 will be at its minimum depth. During the time lag between the acceleration of the tape over work station 12, and the acceleration of tape reels 11 and 13, the loop 18 will be rapidly withdrawn from its box 17 with a rapid increase in the vacuum behind it. The increase vacuum will tend to hold loop 18 in its box 17; and, if not rapidly relieved, it will "jerk" the tape as the vacuum builds up. Conversely, as the tape loop 22 is rapidly drawn into its box, the vacuum relief or increased pressure behind the tape creates an opposing force which, if not rapidly adjusted, may result in tape slack or spillage between the loop 22 and the drive capstan 20.

Since the effect on loops 18 and 22 is opposite and of the same order of magnitude, however, the interconnection of the two loop boxes 17 and 21 by means of the relatively wide common passage 102 enables the one force to relieve the other force by rapid adjustment into a common volume. This enables the use of relatively simple apparatus for exhaustion through port 30, instead of the somewhat more complex equipment which would be required for the rapid exhaustion and relief of individual vacuum boxes. It will be appreciated that a similar consideration applies with respect to tape loops 16 and 24, and the boxes 15 and 23 may therefore, if desired, be interconnected in a manner analogous to that utilized in the case of vacuum boxes 17 and 21.

Still further variations will be suggested to those skilled in the art; and certain of these variations and modifications have already been discussed. In addition, it will be appreciated that rather than having two tape loops between each reel and the work station, a single loop or more than two loops may be provided, as desired. The foregoing description is therefore meant to be illustrative only and should not be considered limitative of my invention; and all such modifications as are in accord with the principles described are meant to fall within the scope of the appended claims.

Having thus described my invention, I claim:

1. In a tape handling apparatus, tape supply means, a work station, a tapered vacuum box having a mouth and a neck, said vacuum box having a varying cross-dimension between said mouth and neck, a length of tape extending in a loop from said supply means into the mouth of said tapered box toward said neck and thence out of said mouth to said work station, said loop being contiguous with the interior walls of said box adjacent both the entrant and exit portions of said loop from said box whereby the cross-dimensional size of said loop varies with variations in the position of said loop in said box, resilient means for applying a tensile force to said tape, means coupled to the neck of said tapered box for reducing the pressure in said box so that said tape loop has a differential pressure on opposed sides thereof the magnitude of which varies with variations in the cross-dimensional size of said loop whereby said loop assumes an equilibrium position in said box dependent upon pressure differences between opposite sides of said loop and upon opposing tensile forces applied by said resilient means to said tape, and control means responsive to changes in position and resulting changes in cross-dimensional size of said tape loop within said box for actuating said supply means whereby the position and cross-dimensional size of said loop in said box is altered to restore said equilibrium condition.

2. The apparatus of claim 1 including drive means moving said tape past said work station whereby said tape loop is fed into said box toward the neck thereof to reduce the cross-dimensional size of said loop thereby to reduce the pressure diffferences between opposite sides of said tape loop, said control means including a selectively actuated motor for causing said supply means thereafter to withdraw said tape loop from said box.

3. In a tape handling apparatus, tape supply means, a work station, a tapered vacuum box having a length of tape extending in a loop from said supply means into the mouth of said tapered box and thence to said work station, means coupled to the neck of said tapered box for reducing the pressure in said box whereby said tape loop assumes an equilibrium condition in said box dependent upon pressure differences within said box between opposite sides of said loop and upon opposing tensile forces applied to said tape, drive means for moving said tape past said work station whereby said tape loop is fed into said box toward the neck thereof thereby to reduce the pressure differences within said box between opposite sides of said tape, and control means responsive to changes in position of said tape loop within said box for altering the position of said loop in said box to restore said equilibrium condition, said control means including a selectively actuated motor for causing said supply means to selectively withdraw said tape loop from said box, said control means further comprising a pivotal member the position of which is at least partially determined by tensile forces in said tape, a resilient member coupled to said pivotal member for opposing tensile forces in said tape whereby said pivotal member assumes an equilibrium position in response to force balance and is selectively displaced from said equilibrium position in response to a force unbalance between said resilient member and said tensile forces in said tape, and electrical means responsive to displacement of said pivotal member from said equilibrium position for actuating said motor.

4. The apparatus of claim 3 including means for selectively changing the forces imposed by said resilient member upon said pivotal member.

5. The apparatus of claim 3 wherein said resilient member comprises an electrical impedance the magnitude of which is dependent upon the position of said pivotal member, said electrical means comprising a circuit which includes said electrical impedance for producing an error voltage output dependent upon the displacement of said pivotal member from said equilibrium position, and means coupling said error voltage to said motor.

6. The apparatus of claim 5 wherein said electrical impedance comprises a pair of elongated carbon-pile resistors disposed colinearly with one another, said pivotal member comprising an arm interposed between said pair of resistors and contiguous with each of said resistors.

7. The apparatus of claim 3 wherein said tape supply means comprises a reel of magnetic tape, said work station comprising a magnetic transducer for selectively cooperating with said magnetic tape for the reading and writing of information.

8. The apparatus of claim 7 wherein said magnetic transducer includes pneumatic means for selectively causing said tape to frictionally bear upon said transducer and for selectively causing said tape to float on an air film essentially free of said transducer.

9. The apparatus of claim 3 wherein said drive means includes a pneumatically operated capstan for selectively drawing said tape past said work station.

10. In a tape handling system, a tapered loop box having a relatively wide mouth and a relatively narrow neck, means coupled to the said neck for effecting a pressure below ambient pressure within said box, the mouth of said box being exposed to the said ambient pressure, tape supply means, means for feeding tape from said supply means into the mouth of said box toward the neck of said box and then out of the mouth of said box thereby to produce a loop of tape within the said box having different pressures on opposite sides thereof whereby pressure forces are exerted on said tape loop in a magnitude dependent upon the size and position of said tape loop in said box, means imposing a tensile force on said tape in opposition to the pressure forces exerted on said tape by pressure differences on opposed sides of said loop whereby said tape loop assumes a position within said box between the mouth and neck thereof so that the size of said loop is such that pressure differences on opposed sides of said loop balance said tensile force, and means responsive to changes in tensile force on said tape for actuating said feeding means to vary the position and size of said loop in said box thereby to restore a force balance between the pressure forces on said tape loop and said tensile force imposing means.

11. The system of claim 10 wherein said loop box comprises a substantially straight-sided funnel-like configuration.

12. The system of claim 10 wherein said loop box defines exponentially curved sides between the mouth and neck thereof.

13. The system of claim 10 wherein the width of said loop box is progressively decreased in a series of discrete steps between the mouth and neck thereof.

14. The system of claim 10 wherein the width of said loop box varies as a non-linear function of the distance from said neck.

15. A tape drive system comprising reversible means for driving the tape in either of two opposite directions, tape storage means including a reel and reel drive motor, means for establishing a slack loop in the tape between the tape drive means and the reel, said means for establishing the slack loop comprising a vacuum column, the slack loop forming a piston in the column, means for generating a control signal indicative of the length of the loop, means for generating a reference signal, means responsive to the direction of the reversible tape drive means for setting the reference signal to one of two different predetermined values depending on the direction of movement of the tape by the drive means, means for producing an error signal with changes in the control signal with relation to the reference signal, whereby the error signal is modified with changes in direction of the tape, and means for controlling the reel motor in response to the error signal to maintain the correct loop length, the average length of the loop being determined by the reference signal.

16. Tape transport system comprising a pair of tape reels for storing tape, the tape extending between the reels, reversible drive means engaging the tape intermediate the two reels, means for establishing slack loops on either side of the reversible drive means, reel motors for controlling the reels to feed out or take up tape as it feeds through the drive means, means for sensing the lengths of the loops in the vacuum columns and generating control signals indicative of the respective loop lengths, means including adjustable reference signals for generating error signals in response to changes in the control signals in relation to the reference signals, means responsive to the direction of tape feed by the reversible drive means for setting each of the reference signals to one of two different predetermined values, said setting means producing respective zero error signals for different loop lengths in the respective slack loops, and means for controlling the reel motors in response to the respective error signals to maintain the slack loops at predetermined lengths as established by the reference signals.

17. Apparatus as defined in claim 16 wherein the means responsive to the direction of tape feed shifts the reference signal controlling the reel motor of the reel receiving tape from the drive means to produce zero error signals with a relatively long loop and shifts the reference signal controlling the reel motor of reel playing out tape to produce zero error signal with a relatively short loop.

References Cited by the Examiner

UNITED STATES PATENTS

| | | | |
|---|---|---|---|
| 1,328,733 | 1/20 | Harris | 271—27 X |
| 1,629,154 | 5/27 | Ybarrondo | 271—2.3 |
| 2,288,716 | 7/42 | Kahn | 271—2.3 |
| 2,612,566 | 9/52 | Anderson et al. | 179—100.2 |
| 2,678,173 | 5/54 | Phelps | 179—100.2 X |
| 2,735,677 | 2/56 | Sandvik | 271—2.3 |
| 2,747,025 | 5/56 | Seisted | 271—2.3 X |
| 2,753,181 | 7/56 | Anander | 271—2.3 |

FOREIGN PATENTS

| | | |
|---|---|---|
| 1,085,854 | 2/55 | France. |

MERVIN STEIN, *Primary Examiner.*

NEWTON N. LOVEWELL, L. MILLER ANDRUS, JOSEPH P. STRIZAK, RUSSELL C. MADER, *Examiners.*